United States Patent

Kato

[11] Patent Number: 5,967,269
[45] Date of Patent: Oct. 19, 1999

[54] VIBRATION DAMPER INCORPORATING OSCILLATING MEANS FOR GENERATING OSCILLATING FORCE FOR RELATIVE DISPLACEMENT OF FIRST AND SECOND MASS ASSEMBLIES

[75] Inventor: Rentaro Kato, Kasugai, Japan

[73] Assignee: Tokai Rubber Industries, Ltd., Japan

[21] Appl. No.: 08/897,317

[22] Filed: Jul. 21, 1997

[30] Foreign Application Priority Data

Jul. 26, 1996 [JP] Japan ................................ 8-197492

[51] Int. Cl.[6] .......................................................... F16F 7/10
[52] U.S. Cl. ................................. 188/380; 267/140.14
[58] Field of Search ................. 267/140.14, 140.15, 267/219, 140.3, 141.2, 141.6, 140.13, 35; 248/562, 636, 638, 646, 651; 188/379, 380

[56] References Cited

U.S. PATENT DOCUMENTS

| | | | |
|---|---|---|---|
| 3,219,305 | 11/1965 | Chartet | 267/140.3 |
| 4,610,420 | 9/1986 | Fukushima et al. | |
| 4,624,435 | 11/1986 | Freudenberg | |
| 4,650,170 | 3/1987 | Fukushima | 267/140.14 |
| 4,660,812 | 4/1987 | Dan et al. | 267/140.13 |
| 5,427,362 | 6/1995 | Schilling et al. | |
| 5,529,295 | 6/1996 | Leibach et al. | |
| 5,642,873 | 7/1997 | Kato | 267/140.14 |
| 5,779,231 | 7/1998 | Okazaki et al. | 267/140.14 |

FOREIGN PATENT DOCUMENTS

| | | |
|---|---|---|
| 0 464 598 A1 | 1/1992 | European Pat. Off. . |
| 2 705 416 A1 | 11/1994 | France . |
| 2-21462 | 6/1985 | Japan . |
| 61-220925 | 10/1986 | Japan . |
| 3-292219 | 12/1991 | Japan . |
| 6-235438 | 8/1994 | Japan . |
| 7-190139 | 7/1995 | Japan . |
| 2 317 670 | 4/1998 | United Kingdom . |
| WO 96/12121 | 4/1996 | WIPO . |
| WO 98/44275 | 10/1998 | WIPO . |

OTHER PUBLICATIONS

Patent Abstracts of Japan; vol. 011, No. 044 (M–560); Feb. 10, 1987 & JP 61 207214 A (Mitsubishi Electric Corp): Sep. 13, 1986 *abstract*.

Primary Examiner—Robert J. Oberleitner
Assistant Examiner—Melanie Talavera
Attorney, Agent, or Firm—Parkhurst & Wendel, L.L.P.

[57] ABSTRACT

A vibration damper including a mounting member fixed to a subject body whose vibration is to be damped, a first mass assembly disposed such that the first mass assembly is displaceable relative to the mounting member in a direction of vibration of the subject body, a first elastic member elastically connecting the first mass assembly to the mounting member, a second mass assembly disposed such that the second mass assembly is displaceable relative to the mounting member and the first mass assembly in the direction of vibration, a second elastic member elastically connecting the second mass assembly to the mounting member, and an oscillating device for generating an oscillating force acting on the first and second mass assemblies so as to cause relative displacement therebetween.

8 Claims, 2 Drawing Sheets

VIBRATION DAMPER INCORPORATING OSCILLATING MEANS FOR GENERATING OSCILLATING FORCE FOR RELATIVE DISPLACEMENT OF FIRST AND SECOND MASS ASSEMBLIES

This application is based on Japanese Patent No. JP-A-10-38020, the content of which is incorporated hereinto by reference.

BACKGROUND OF THE INVENTION

1. Field of the Invention

The present invention relates to a vibration damper installed on a subject body for reducing vibration of the subject body. More particularly, the present invention is concerned with such a vibration damper incorporating suitable oscillating means.

2. Discussion of the Related Art

A dynamic damper is widely known as vibration damping means for damping or reducing vibration of a desired subject body such as a body of an automotive vehicle, which is subject to a vibrational load. In recent years, an active-type vibration damper has been proposed as disclosed in JP-A-61-220925 and JP-A-3-292219. Such an active-type vibration damper as disclosed in these publications is adapted to reduce or control the vibration of the subject body, by using an actuator which generates an oscillating force to be applied to the subject body.

However, the conventional dynamic damper is not capable of exhibiting a desired damping effect in an operating environment in which the frequency of the vibration to be damped changes depending upon various factors. Where the subject body is the body of an automotive vehicle, for instance, the vehicle body is subject to various kinds of vibrations which are generated under different running conditions of the vehicle, for example, depending upon changes in the operating speed of the vehicle engine and the running speed of the vehicle.

Further, the vibration damping effect provided by the known dynamic damper is not satisfactory, since it functions as a secondary vibration system adapted to reduce the vibration of the subject body constituting a primary vibration system, by absorbing the vibration energy of the subject body.

In the active-type vibration damping device, it is required to employ an actuator capable of generating an oscillating force which is large enough to assure a high damping effect with respect to the subject body. Where the subject body has a large size and high rigidity, as in the case of the vehicle body, the energy of the vibration of the subject body is accordingly large. Accordingly, the actuator is required to be large-sized, and the electric power consumed by the actuator is inevitably increased. In addition, it is difficult to apply a sufficient oscillating force to the large and highly rigid subject body. Thus, the conventional active-type vibration damping device is not satisfactory in its damping effect.

Another type of known active-type vibration damping device is disclosed in JP-A-6-235438 and JP-A-7-190139, wherein a vibration system is constituted by a mounting member fixed to the subject body, and an inertia mass member elastically connected to the mounting member through a suitable spring member. The vibration damping device includes an electromagnetic drive mechanism for applying an oscillating force to the inertia mass member of the vibration system, so that a large oscillating force is applied to the subject body, by utilization of a resonance action of the vibration system.

In the known active-type vibration damping device utilizing the resonance action of the vibration system described above, however, the frequency of the vibration of the subject body that can be effectively damped by application of the oscillating force to the subject body is limited to a resonance frequency range whose upper and lower limits are relatively close to the resonance frequency of the vibration system. Where the vibration of the subject body has the frequency outside the resonance frequency range, the vibration cannot be effectively damped by application of the oscillating force to the subject body. Therefore, the damping device is not capable of exhibiting a desired damping effect, particularly where the damping device is used for damping the vibration of the body of a motor vehicle, which is generally subject to the vibration whose frequency changes over a relatively wide range.

SUMMARY OF THE INVENTION

It is therefore an object of the present invention to provide a vibration damper which is relatively small-sized and constructed so as to apply a sufficiently large oscillating force to the subject body with a relatively small amount of electric power, and exhibit a desired damping effect over a wide rage of frequency of the vibration of the subject body.

The above object may be achieved according to the principle of the present invention, which provides a vibration damper comprising: (a) a mounting member fixed to a subject body whose vibration is to be damped; (b) a first mass assembly disposed such that the first mass assembly is displaceable relative to the mounting member in a direction of vibration of the subject body; (c) a first elastic member elastically connecting the first mass assembly to the mounting member; (d) a second mass assembly disposed such that the second mass assembly is displaceable relative to the mounting member and the first mass assembly in the direction of vibration; (e) a second elastic member elastically connecting the second mass assembly to the mounting member; and (f) oscillating means for generating an oscillating force acting on the first and second mass assemblies so as to cause relative displacement therebetween.

In the vibration damper of the present invention constructed as described above, the first mass assembly is elastically connected to the mounting member through the first elastic member, whereby the first vibration system is formed, while the second mass assembly is elastically supported by the mounting member through the second elastic member, whereby the second vibration system is formed. The oscillating force generated by the oscillating means acts on the first and second mass assemblies, as a force for displacing these mass assemblies relative to each other, so that the oscillating force is transferred to the mounting member and the subject body through the first and second vibration systems.

With the resonance frequencies of the first and second vibration systems being suitably determined, the oscillating force generated by the oscillating means is boosted owing to the resonance of the first and second vibration systems, when the oscillating means is operated at the resonance frequences of the vibration systems. Since the boosted oscillating force is transferred to the mounting member, the required oscillating force can be obtained with a relatively small amount of electric energy applied to the oscillating means. Accordingly, the required output and size of the oscillating means can be reduced, and the amount of electric energy required for energizing the oscillating means is accordingly reduced, while permitting the vibration damper to exhibit a desired vibration damping effect.

In a first preferred form of the present invention, the first mass assembly and the first elastic member constitute a first vibration system having a first resonance frequency, while the second mass assembly and the second elastic member constitute a second vibration system having a second resonance frequency which is different from the first resonance frequency.

In the above preferred form of the vibration damper of the present invention, the oscillating force generated by the oscillating means can be suitably boosted by the resonance of the first and second vibration systems at the predetermined different resonance frequencies thereof upon energization of the oscillating means at the resonance frequencies. Further, the oscillating force is considerably boosted or increased even when the oscillating means is operated at a frequency between the resonance frequencies of the two vibration systems. Therefore, where the frequency of the oscillation of the oscillating means can be changed continuously or in steps between the resonance frequencies of the two vibration systems, the vibration of the subject body can be effectively damped over a relatively wide range of frequency, by the sufficiently large oscillating force generated by the oscillating means.

In a second preferred form of the invention, the mounting member comprises a cylindrical support portion, and the first mass member comprises a first cylindrical connecting portion which is disposed radially outwardly of the cylindrical support portion with a predetermined radial distance therebetween, while the second mass member comprises a second cylindrical connecting portion which is disposed radially inwardly of the cylindrical support portion with a predetermined radial distance therebetween. In this case, the first elastic body consists of a first annular rubber body interposed between the cylindrical support portion and the first cylindrical connecting portion, while the second elastic body consists of a second annular rubber body interposed between the cylindrical support portion and the second cylindrical connecting portion.

In the vibration damper according to the above second preferred form of this invention, the first and second mass assemblies and the first and second elastic members in the form of the annular rubber bodies are disposed so as to effectively utilize the space within the vibration damper, whereby the vibration damper is simplified in construction and small-sized. The present arrangement is also advantageous in that the rubber bodies may be formed to undergo shear deformation in the direction of the vibration of the subject body, so that one of the two vibration systems can be designed to have a relatively low resonance frequency so that the frequency range of the vibration to be effectively damped by the vibration damper is increased.

In a third preferred form of this invention, the first elastic member consists of a first rubber body interposed between the mounting member and the first mass assembly, while the second elastic member consists of a second rubber body interposed between the mounting member and the second mass assembly, and these first and second rubber bodies are formed integrally with each other.

The vibration damper according to the above third preferred form of the invention can be simplified in construction and can be manufactured with comparatively high efficiency, owing to the integral formation of the first and second rubber bodies. Further, the first and second rubber bodies can be formed with ease so as to exhibit the desired spring characteristics.

In a fourth preferred form of the invention, the oscillating means generates the oscillating force whose frequency is variable.

The vibration damper according to the above fourth preferred form of the invention is advantageously used for the subject body which is subject to a vibration whose frequency tends to vary or different kinds of vibrations having considerably different frequencies. Where the present vibration damper is adapted such that the first and second vibration systems have respective different resonance frequencies as described above with respect to the first preferred form of the invention, the vibration of the subject body having the resonance frequency of the first or second vibration system can be effectively damped by the oscillation force generated by the generating means when the oscillation frequency is regulated selectively to one of the resonance frequencies of the two vibration systems.

In a fifth preferred form of the invention, the oscillating means comprises electromagnetic driving means for generating an electromagnetic force between the first and second mass assemblies.

In the vibration damper according to the above fifth preferred form of the invention, the electromagnetic force generated by the electromagnetic driving means acts on the first and second mass assemblies for relative displacement thereof, while preventing a contact of the first and second mass assemblies, so that the first and second mass assemblies can be displaced relative to each other with high stability. Further, the electromagnetic driving means is capable of easily adjusting the magnitude and frequency of the oscillating force acting on the first and second mass assemblies, by controlling the amount of an electric energy applied to the driving means, or the frequency of an electric current applied thereto.

In an advantageous arrangement of the above fifth preferred form of the invention, one of the first and second mass assemblies includes a permanent magnet fixed thereto so as to form a magnetic path, while the other of the first and second mass assemblies includes a coil fixed thereto and disposed in a magnetic gap defined in the magnetic path. In this instance, the electromagnetic driving means is adapted to generate the electromagnetic force between the first and second mass assemblies, by application of an electric current to the coil.

In the vibration damper according to the above advantageous arrangement, one of the two mass assemblies contributes to the formation of a magnetic path, while the other mass assembly includes the coil disposed in a magnetic gap in the magnetic path. This arrangement permits a high magnetic flux density around the coil, making it possible to increase the electromagnetic force acting on the first and second mass assemblies so as to cause relative displacement of these two mass assemblies with high efficiency. Further, the electromagnetic force acting on the first and second mass assemblies can be easily controlled by regulating the amount and frequency of the electric current applied to the coil.

The above vibration damper is also advantageous in that the mass of members (e.g., a yoke and a permanent magnet) of the vibration system which define the magnetic path facilitates the tuning of the resonance frequency of that vibration system so as to be lower than the resonance frequency of the other vibration system. For instance, the resonance frequency of the vibration system including the magnetic path defining members is tuned to the frequency of a low-frequency large-amplitude vibration such as engine idling vibration of the body of an automotive vehicle, which is caused by idling of the engine of the vehicle. In this case, the relatively large-amplitude engine idling vibration of the vehicle body can be effectively damped by application of a sufficiently large oscillating force generated by the oscillating means when the oscillating means is operated at the relatively low resonance frequency of the vibration system which includes the members defining the magnetic path.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
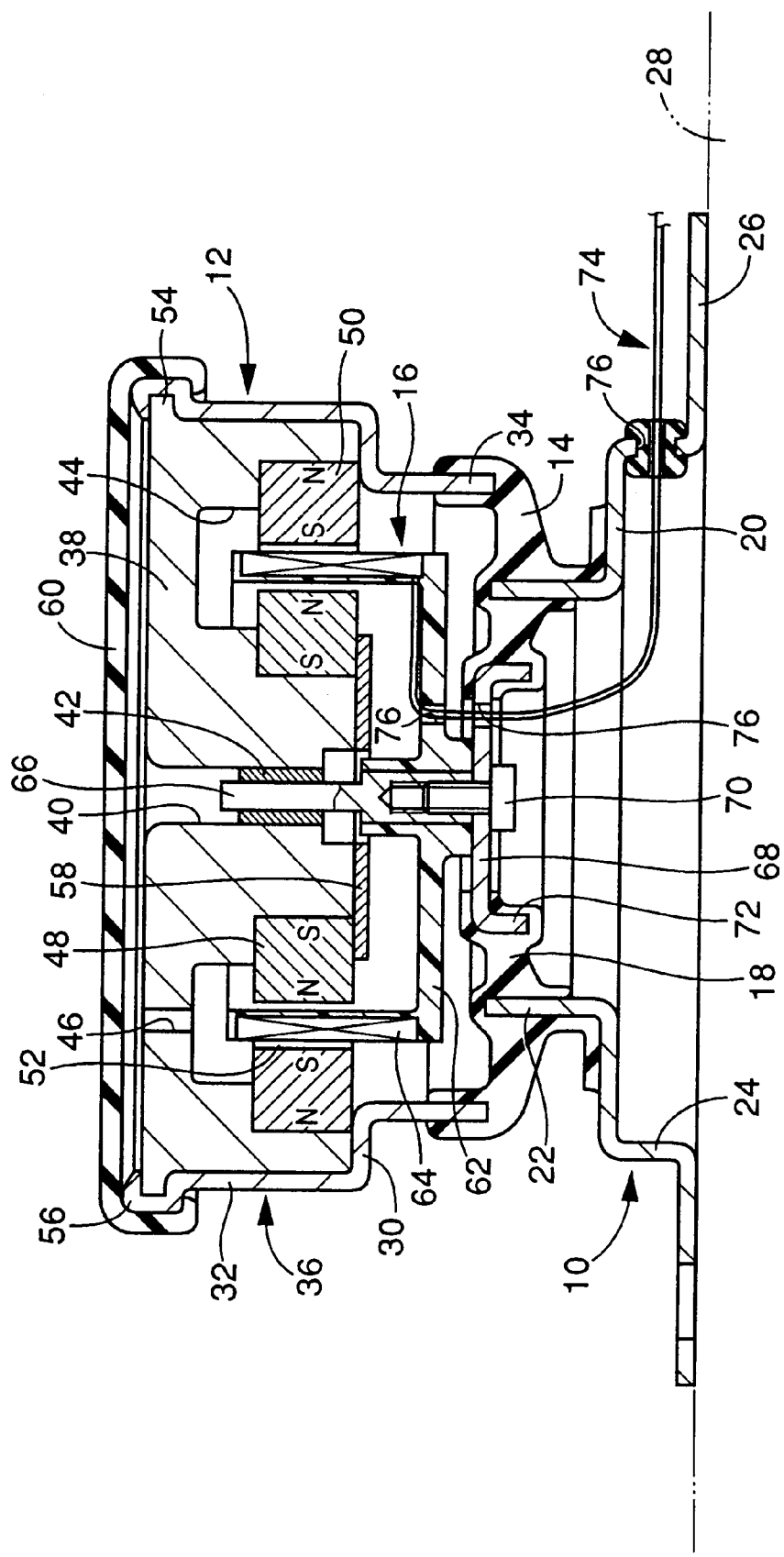
FIG. 1 is an elevational view in vertical cross section of a vibration damper constructed according to one preferred embodiment of this invention.

Referring first to FIG. 1, the vibration damper shown therein includes a mounting member 10 made of a metallic material, a first mass assembly 12, a first elastic member in the form of a first rubber body 14, a second mass assembly 16, and a second elastic member in the form of a second rubber body 18. To the mounting member 10, there are elastically connected the first and second mass assemblies 12, 16 through the first and second rubber bodies 14, 18, respectively. The first mass assembly 12 and the first rubber body 14 cooperate to constitute a first vibration system, while the second mass assembly 16 and the second rubber body 18 cooperate to constitute a second vibration system. The first and second mass assemblies 12, 16 are displaceable relative to each other and to the mounting member 10, in a vertical direction in which a primary vibrational load to be damped by the present vibration damper is applied thereto.

The mounting member 10 of the present vibration damper is a stepped cylindrical member including an axially intermediate shoulder portion 20, a small-diameter portion 22 located on one of axially opposite sides of the shoulder portion 20, and a large-diameter portion 24 located on the other side of the shoulder portion 20. The mounting member 10 also includes an annular mounting seat 26 radially outwardly extending from the open end of the large-diameter portion 24. The annular mounting seat 26 has a relatively large dimension in the radial direction of the mounting member 10. The mounting member 10 is fixed at its mounting seat 26 directly to a subject body 28 whose vibration is to be damped by the present vibration damper. The mounting seat 26 is held in abutting contact with a surface of the subject body 28 by suitable fastening means such as bolts.

The first mass assembly 12 includes a retainer sleeve 36 which is a stepped cylindrical member including a shoulder portion 30, a large-diameter portion 32 located on one of axially opposite sides of the shoulder portion 30, and a small-diameter portion 34 located on the other side of the shoulder portion 30. A yoke 38 made of an iron or other ferromagnetic material is fixedly accommodated within the large-diameter portion 32 of the retainer sleeve 36. the yoke 38 is a generally circular disc-shaped member, which has a relatively large thickness and a center guide hole 40 formed therethrough along its centerline aligned with the axis of the retainer sleeve 36. A guide sleeve 42 is fixedly fitted in the center guide hole 40. The yoke 38 has an annular groove 44 formed concentrically with the center guide hole 40. The annular groove 44 is U-shaped in cross section as viewed in FIG. 1, and is axially downwardly open in the lower surface of the yoke 38. The yoke 38 has at least one air breather hole 46 open in the bottom of the annular groove 44.

Within the lower portion of the annular groove 44, there are fixedly accommodated an annular inner permanent magnet 48 and an annular outer permanent magnet 50 such that the inner and outer permanent magnets 48, 50 are in contact with respective inner and outer circumferential surfaces of the annular groove 44. Each of these magnets 48, 50 may be either a one-piece body or consists of two or more pieces arranged in the circumferential direction of the yoke 38. Each annular magnet 48, 50 has magnetic poles N and S on its radially inner and outer portions, and the two annular magnets 48, 50 are radially spaced apart from each other by a predetermined distance such that the outer circumferential surface of the inner magnet 48 and the inner circumferential surface of the outer magnet 50 are opposed to each other with a radial spacing equal to the above-indicted distance. These outer and inner circumferential surfaces of the inner and outer magnets 48, 50 have the opposite magnetic poles N, S, as indicated in FIG. 1.

The yoke 38 and the permanent magnets 48, 50 cooperate to form a substantially closed magnetic path extending from the inner circumferential surface of the inner magnet 48 (annular groove 44) to the outer circumferential surface of the outer magnet 48 (annular groove 44) through the radially inner cylindrical wall, annular bottom wall and radially outer cylindrical wall of the yoke 38, which define the annular groove 44. The radial spacing between the outer and inner circumferential surfaces of the inner and outer magnets 48, 50 provides an annular magnetic gap 52.

In assembling the first mass assembly 12, the yoke 30 with the inner and outer permanent magnets 48, 50 accommodated in the annular groove 44 is inserted into the large-diameter portion 32 of the retainer sleeve 36 through the upper opening of the large-diameter portion 32, and is positioned relative to the retainer sleeve 36 by abutting contact of the lower end face of the yoke 38 with the shoulder portion 30 of the retainer sleeve 36. The yoke 38 has an annular protrusion 54 at its upper end, while the retainer sleeve 36 has a calking or crimping portion 56 at the upper end of the large-diameter portion 32. The yoke 38 is secured-to the retainer sleeve 36 by calking the calking portion 56 against the annular protrusion 54. With the yoke 38 thus fixedly accommodated within the large-diameter portion 32 of the retainer sleeve 36, the outer permanent magnet 50 is held in contact with the shoulder portion 30, while the inner permanent magnet 48 is held in contact with a retainer plate 58 fixed to a central portion of the lower end face of the yoke 38, so that the magnets 48, 50 are prevented from being removed from the yoke 38. The upper opening of the large-diameter portion 32 of the retainer sleeve 36 is closed by a sealing rubber layer 60, to prevent entry of foreign matters into the yoke 38.

Thus, the first mass assembly 12 is constituted by the yoke 38, the permanent magnets 48, 50 accommodated within the yoke 38, and the retainer sleeve 36 accommodating the yoke 38 and the permanent magnets 48, 50.

The first mass assembly 12 is disposed coaxially with the mounting member 10 such that the yoke 38 is positioned above the mounting member 10 with a suitable axial spacing distance therebetween, and such that the annular groove 44 is open downwards. The small-diameter portion 34 of the retainer sleeve 36 is radially spaced apart from the small-diameter portion 22 of the mounting member 10 by a predetermined distance. These small-diameter portions 34, 22 are elastically connected to each other by the first rubber body 14 formed therebetween. The first rubber body 14 is an annular member having radially outer and inner portions to which the smaller-diameter portions 34, 22 are bonded in the process of vulcanization of a rubber material to form the first rubber body 14. Thus, the first mass assembly 12 including the retainer sleeve 36 is elastically connected to the mounting member 10 by the first elastic member in the form of the first rubber body 14.

It will be understood that the small-diameter portion 22 of the mounting member 10 serves as a cylindrical support portion, while the small-diameter portion 34 of the retainer sleeve 36 serves as a first cylindrical connecting portion at which the first mass assembly 12 is elastically connected to the cylindrical support portion 22 through the first annular rubber body 14.

The second mass assembly 16 includes a bobbin 62 and a coil 64. The bobbin 62 is a cylindrical member which is closed at one of its opposite ends, and the coil 64 is wound on the outer circumferential surface of the cylindrical portion of the bobbin 62. The bobbin 62 has a guide pin 66 fixed to its bottom wall so as to extend into the interior of the cylindrical wall such that the guide pin 66 is aligned with the axis of the cylindrical wall. To the outer surface of the bottom wall of the bobbin 62, there is fixed a connecting member 68 by a screw 70. The connecting member 68 consists of a generally disc-like base, and a cylindrical wall 72 which is formed integrally with the disc-like base so as to extend from the periphery of the disc-like base in the downward direction away from the bobbin 62.

Thus, the second mass assembly 16 is constituted by the bobbin 62, and the coil 64, guide pin 66 and connecting member 68 which are fixed to the bobbin 62. The second mass assembly 16 is disposed coaxially with the first mass assembly 12 such that the annular coil 64 extends through the annular magnetic gap 52 while the guide pin 66 extends through the guide sleeve 42, so that the second mass assembly 16 is movable or displaceable relative to the first mass assembly 12 in the axial direction.

The inside diameter of the cylindrical portion of the bobbin 62 and the outside diameter of the coil 64 are determined so that a predetermined small clearance is left between the outer circumferential surface of the inner permanent magnet 48 and the inner circumferential surface of the cylindrical portion of the bobbin 62, and between the outer circumferential surface of the coil 64 and the inner circumferential surface of the outer permanent magnet 50. With the guide pin 66 slidably guided by the guide sleeve 42, the coil 64 is smoothly movable within the annular magnetic gap 52 in the axial direction, together with the cylindrical portion of the bobbin 62, without a movement of the bobbin 62 in the radial direction.

The second mass assembly 16 axially movable relative to the first mass assembly 12 is positioned relative to the mounting member 10 such that the cylindrical wall 72 of the connecting member 68 located at the lower end of the second mass assembly 16 is disposed coaxially with and radially inwardly of the small-diameter portion 22 of the mounting member 10, with a predetermined radial spacing distance therebetween. The small-diameter portion 22 of the mounting member 10 and the cylindrical wall 72 of the connecting member 68 are elastically connected to each other by the second rubber body 18 formed therebetween. The second rubber body 18 is an annular member having radially outer and inner portions to which the smaller-diameter portion 22 and the cylindrical wall 72 are bonded in the process of vulcanization of a rubber material to form the second rubber body 18. Thus, the second mass assembly 16 including the connecting member 68 is elastically connected to the mounting member 10 by the second elastic member in the form of the second rubber body 18.

It will be understood that the cylindrical wall 72 of the connecting member 68 serves as a second cylindrical connecting portion at which the second mass assembly 16 is elastically connected to the cylindrical support portion 22 of the mounting member 10 through the second annular rubber body 18.

In the present embodiment, the first rubber body 14 and the second rubber body 18 are formed integrally with each other, with the mounting member 10, retainer sleeve 36 and connecting member 60 being bonded thereto in the process of vulcanization. That is, the first and second rubber bodies 14, 18, mounting member 10, retainer sleeve 36 and connecting member 50 constitute an integral structure to which are fixed the yoke 38 accommodating the permanent magnets 48, 50 and the bobbin 62 carrying the coil 64.

For connecting a lead wire 74 to the coil 64 for energizing the coil 64, there are provided through-holes 76 formed through the bottom wall of the bobbin 62, the disc-like base of the connecting member 68 and the large-diameter portion 24 of the mounting member 10.

When the coil 64 is energized by an electric current applied thereto through the lead wire 74, an electromagnetic force is generated in a magnetic field in the magnetic gap 52, so as to produce a force for displacing the yoke 38 and the coil 64 relative to each other, to thereby displace the first and second mass assemblies 12, 16 relative to each other in the axial direction. When an intermittent or pulsating current or an alternating current is applied to the coil 64, there is produced an oscillating force for oscillating the first and second mass assemblies 12, 16 in the axial direction, in the presence of elastic forces of the first and second rubber bodies 14, 18. By regulating the frequency and the amount of the electric current applied to the coil 64, the frequency and the magnitude of the oscillating force may be controlled.

It will be understood that the yoke 38 and the permanent magnets 48, 50 of the first mass assembly 12 cooperate to function as a magnetic field generating device, which cooperates with the coil 64 to constitute electromagnetic driving means for generating an electromagnetic force acting on the first and second mass assemblies 12, 16. This electromagnetic driving means is one form of oscillating means for generating an oscillating force acting on the first and second mass assemblies 12, 16.

The first vibration system consisting of the first mass assembly 12 and the first rubber body 14, and the second vibration system consisting of the second mass assembly 16 and the second rubber body 18 have respective resonance frequencies (natural frequencies) which are determined by the specific masses of the mass assemblies 12, 16 and the specific spring constants of the rubber bodies 14, 18. Since the yoke 38 and the permanent magnets 48, 50 of the first mass assembly 12 have comparatively large masses, the resonance frequency of the first vibration system is lower than that of the second vibration system.

In the vibration damper constructed as described above, the application of an alternating current to the coil 64 causes an oscillating force to act between the first and second mass assemblies. When the frequency of the alternating current is regulated to a value equal to or relatively close to the resonance frequency of the first vibration system, the vibration amplitude and acceleration of the first mass assembly 12 are increased owing to the resonance of the first vibration system, so that the vibration of the first mass assembly 12 is transferred to the mounting member 10 through the first rubber body 14, whereby the vibration of the subject body 28 can be effectively damped with the relatively large oscillating force acting on the first and second mass assemblies 12, 16 and transferred to the mounting member 10. When the frequency of the alternating current is regulated to a value equal to or relatively close to the resonance frequency of the second vibration system, the vibration amplitude and acceleration of the first mass assembly 12 are relatively small and low, while the vibration amplitude and acceleration of the second mass assembly 16 are increased, so that the vibration of the second mass assembly 16 is transferred to the mounting member 10 through the second rubber body 18, whereby the vibration of the subject body 28 can be effectively damped with the relatively large oscillating force acting on the first and second mass assemblies 12, 16 and transferred to the mounting member 10.

In the present embodiment, the resonance frequencies of the first and second vibration systems are determined to be different from each other, so that the vibration amplitude of the second vibration system is sufficiently smaller than that of the first vibration system when the frequency of the alternating current applied to the coil 64 is tuned to the resonance frequency of the first vibration system, while the vibration amplitude of the first vibration system is sufficiently smaller than that of the second vibration system when the frequency of the alternating current applied to the coil 64 is tuned to the resonance frequency of the second vibration system. In this arrangement, the oscillating force produced on the basis of the resonance of each vibration system at its resonance frequency is effective to damp the subject body 28, without significant reduction of the oscillating force by the other vibration system.

Further, the resonance of the first and second vibration systems permits the oscillating force to be boosted to effectively damp the mounting member 10 and consequently the subject body 28, even when the frequency of the alternating current is intermediate between the resonance frequencies of the two vibration systems.

With the present vibration damper being installed or fixed to a suitable position or positions of the subject body 28, the vibration of the subject body 28 can be effectively damped or controlled, over a wide range of frequency including a range between the resonance frequencies of the first and second vibration systems, by suitably regulating or changing the frequency of the electric current applied to the coil 64.

To effectively damp the specific frequencies of the vibrations of the desired subject body 28, the resonance frequencies of the first and second vibration systems are determined depending upon those specific vibration frequencies to be damped, by suitably determining the masses of the first and second mass assemblies 12, 16 and the spring characteristics of the first and second rubber bodies 14, 18. In other words, the vibration damper exhibits the desired damping characteristics by suitably determining the masses and spring characteristics of the first and second vibration systems.

Since the first and second vibration systems are adapted to produce a sufficiently large oscillating force with a given amount of electric energy for energizing the coil 64, the electromagnetic driving means 38, 48, 50, 64 can be small-sized, and the required amount of electric energy can be reduced, while permitting the vibration damper to exhibit the desired damping effect. Accordingly, the size and weight and the required electric energy of the present vibration damper can be considerably reduced.

The electromagnetic driving means 38, 48, 50, 64 is basically of a voice coil type (VCM type), capable of stably producing a sufficiently large oscillating force acting on the first and second mass assemblies 12, 16, with a relatively large oscillation amplitude, making it possible to effectively control the vibration of the subject body 28.

Figure 2:
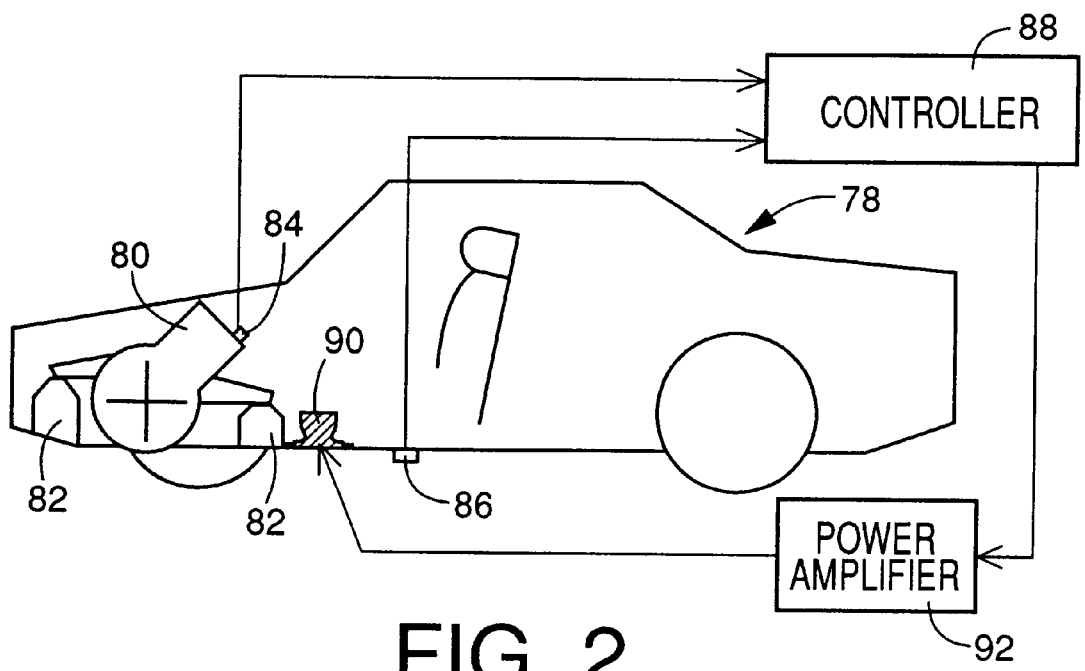
FIG. 2 is a schematic view illustrating a vibration damping system employing the vibration damper of FIG. 1, which is provided on an automotive vehicle.

Referring next to schematic view of FIG. 2, there is illustrated a vibration damping system used with an automotive vehicle, wherein a vibration damper 90 according to the present invention is attached to a body 78 of the vehicle, to damp a low-frequency vibration in the form of an engine idling vibration caused by idling of a vehicle engine, and a high-frequency vibration of the form of a booming noise generated during running of the vehicle. In this vibration damping system, a power unit 80 including the engine is supported by the vehicle body 78 through an engine mount 82. The power unit 80 is a source of vibration, namely, generates the engine idling vibration, and the body 78 is a subject body whose vibration is to be damped by the vibration damper 90. The power unit 80 is provided with a first vibration sensor 84, while the vehicle body 78 is provided with a second vibration sensor 86, which is located on a part of a floor below a front seat. In the present example, the vibration damper 90 is located at an antinode of vibration of the vehicle body 78, so that the oscillating force produced by the vibration damper 90 has a sufficiently high damping effect at the position of the second vibration sensor 86, since it is desired to damp the vibration at the portion of the vehicle body 78 at which the front seat is provided.

The vibration damper 90 is controlled by a controller 88 through a power amplifier 92. The controller 88 is adapted to receive output signals of the first and second vibration sensors 84, 86, and determine the frequency, phase and amount of an electric current to be applied to the coil 64 of the vibration damper 90, on the basis of the received output signals, so as to damp the vibration of the vehicle body 78. The output signal of the first vibration sensor 84 is used as a reference vibration signal, while the output of the second vibration sensor 86 is used as a control error signal. The controller 88 applies the electric current to the vibration damper 90 through the power amplifier 92, to positively reduce the amplitude of the vibration of the vehicle body 78. The controller 88 may be adapted to effect an adaptive control or a PID (proportional, integral and differential) control for controlling the coil 64, in a manner as well known in the art.

The resonance frequencies f1 and f2 of the first and second vibration systems are represented by the following equations:

$$f1 = (\tfrac{1}{2})\sqrt{(k1/W1)}$$

$$f2 = (\tfrac{1}{2})\sqrt{(k2/W2)}$$

In the above equations, W1, k1, W2 and k2 respectively represent the mass of the first mass assembly 12, the spring constant of the first rubber body 14, the mass of the second mass assembly 16 and the spring constant of the second rubber body 18.

Where the mass W1 is smaller than the mass W2 while the spring constant k1 is smaller than the spring constant K2, the resonance frequency f1 of the first vibration system is lower than the resonance frequency f2 of the second vibration system. In the present example, the values W1, W2, k1 and k2 are determined so that the resonance frequency f1 falls within a range of 20–35 Hz of the engine idling frequency while the resonance frequency f2 falls within a range of 50–200 Hz of the booming noise. In this case, the vibration damper 90 is capable of exhibiting a desired damping effect with respect to both the engine idling vibration (low-frequency vibration) and the booming noise (high-frequency vibration).

The vibration damper 90 are disposed at appropriate positions on the vehicle body 78, irrespective of the positions of the engine mounts 82, depending upon the efficiency of transmission of the oscillating force from the vibration damper 90 to the desired portion of the vehicle body 78 and the space available for installation of the vibration damper 90. The vibration damper 90 may be disposed near the engine mount 82, or superposed on the engine mount 82 in a suitable manner.

While the presently preferred embodiment of this invention has been described above for illustrative purpose only, it is to be understood that the invention is not limited to the details of this illustrated embodiment, but may be otherwise embodied.

Although the VCM type electromagnetic driving means is used to produce an oscillating force acting on the the first and second mass assemblies 12, 16, other electromagnetic driving means or other means may be employed to cause relative axial displacement of the first and second mass assemblies 12, 16 for damping the vibration of the subject body 28. In the illustrated embodiment, the first and second rubber bodies 14, 18 function to return the first and second mass assemblies 12, 16 after each relative displacement of these assemblies 12, 16 by energization of the coil 64. Where the first and second mass assemblies 12, 16 are returned by elasticity of such elastic members, the force generating means for generating the oscillating force may be adapted to displace the second mass assembly 16 relative to the first mass assembly 12 in only one of the opposite axial directions, since the displacement in the other axial direction can be obtained by the elastic members.

While the first and second rubber bodies 14, 18 are used as the elastic members, other members such as sheet springs may be used as the elastic members.

Where the electromagnetic driving means is employed, the resonance frequency of the second vibration system including the coil 64 may be made lower than that of the first vibration system including the permanent magnets 48, 50.

Although the vibration damper of the illustrated embodiment is adapted to apply an oscillating force to the subject body to thereby damp the vibration of the subject body, the vibration damper may be adapted to operate like a dynamic absorber, so as to absorb a vibration energy of the subject body to thereby damp the subject body.

It is to be understood that the present invention may be embodied with various other changes, modifications and improvements, which may occur to those skilled in the art, without departing from the scope of the invention defined in the appended claims.

EXAMPLES

A vibration damper was manufactured with the first and second vibration systems whose resonance frequencies f1 and f2 are 30 Hz and 174 Hz, respectively, and in which the mass W1 of the first mass assembly (12), the spring constant k1 of the first rubber body (14), the mass W2 of the second mass assembly (16) and the spring constant k2 of the second rubber body (18) are as follows:

W1=1000 g
k1=3.6 kgf/mm
W2=80 g
k2=10.0 kgf/mm

Figure 3:
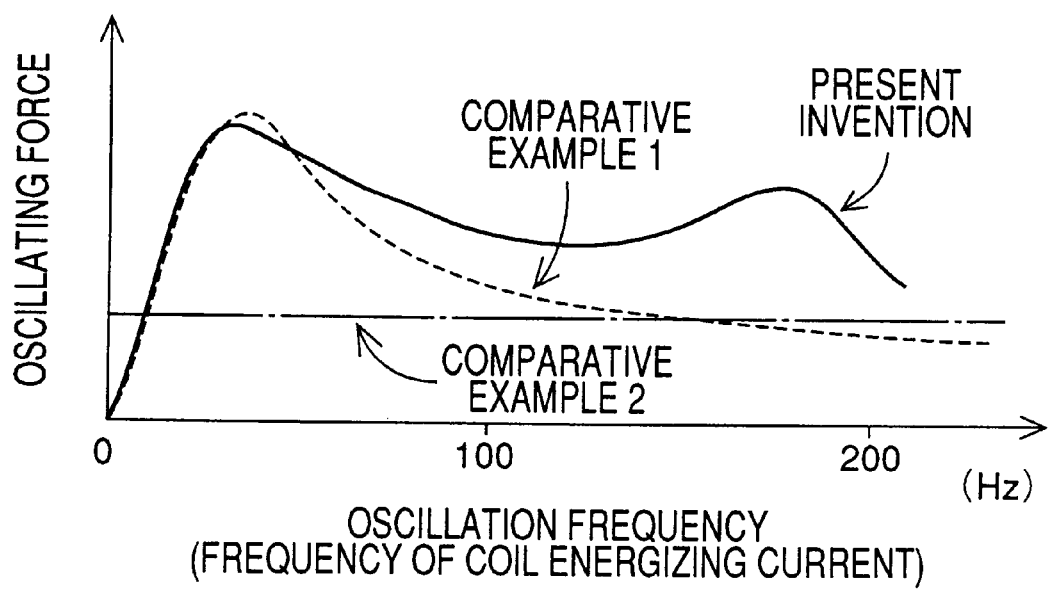
FIG. 3 is a graph indicating a relationship between an oscillating force generated in the vibration damper of FIG. 1 and the frequency of an electric current applied to generate the oscillating force, as compared with relationships of comparative examples.

The coil (64) was energized with an alternating current applied thereto, and the oscillating force produced was measured in relation to the frequency of the alternating current (oscillating frequency), which was changed during the test. A relationship between the measured oscillating force and frequency is indicated by solid line in the graph of FIG. 3.

For comparison with the vibration damper according to the present invention, there was prepared a vibration damper according to Comparative Example 1, wherein the second mass assembly (16) is fixed to the mounting member 10. A relationship between the oscillating force and frequency of this vibration damper of the Comparative Example 1 was measured in the same manner. This relationship is indicated by broken line in the graph of FIG. 3. Further, a device including the electromagnetic driving means used in the vibration damper of the illustrated embodiment was prepared as Comparative Example 2, and the coil (64) was energized by an alternating current. The oscillating force produced by this device was measured while the oscillation frequency was changed. A relationship between the measured oscillating force and frequency of this Comparative Example 2 is indicated by one-dot chain line in FIG. 3.

It will be understood from the result of the test of the examples indicated above that the oscillating force generated by the vibration damper according to the present invention is considerably larger than the oscillating force generated by the device of the Comparative Example 2, not only when the oscillation frequency (frequency of the alternating current) is equal to the resonance frequencies of the first and second vibration systems, but also when the oscillation frequency is in a range between the resonance frequencies of the vibration systems.

What is claimed is:

1. A vibration damper comprising:
    a mounting member fixed to a subject body whose vibration is to be damped;
    a first mass assembly located such that said first mass assembly is displaceable relative to said mounting member in a direction of vibration of said subject body;
    a first elastic member elastically connecting said first mass assembly to said mounting member;
    a second mass assembly located such that the second mass assembly is displaceable relative to said mounting member and said first mass assembly in said direction of vibration;
    a second elastic member elastically connecting said second mass assembly to said mounting member; and
    oscillating means for generating an oscillating force acting on said first and second mass assemblies to cause relative displacement therebetween,
    wherein said oscillating means includes at least one portion of said first mass assembly, and at least one portion of said second mass assembly.

2. A vibration damper according to claim 1, wherein said first mass assembly and said first elastic member constitute a first vibration system having a first resonance frequency, while said second mass assembly and said second elastic member constitute a second vibration system having a second resonance frequency which is different from said first resonance frequency.

3. A vibration damper according to claim 1, wherein said oscillating means generates said oscillating force whose frequency is variable.

4. A vibration damper according to claim 1, wherein one of said first and second mass assemblies includes a yoke member and a permanent magnet fixed to said yoke member, while the other of said first and second mass assemblies includes a coil.

5. A vibration damper according to claim 4, wherein said at least one portion of said first mass assembly includes said yoke member and said permanent magnet, while said at least one portion of said second mass assembly includes said coil.

6. A vibration damper comprising:

a mounting member fixed to a subject body whose vibration is to be damped, and comprising a cylindrical support portion;

a first mass assembly located such that said first mass assembly is displaceable relative to said mounting member in a direction of vibration of said subject body, and said first mass assembly comprises a first cylindrical connecting portion which is disposed radially outwardly of said cylindrical support portion with a predetermined first radial distance therebetween;

a first elastic member elastically connecting said first mass assembly to said mounting member, and comprising a first annular rubber body interposed between said cylindrical support portion and said first cylindrical connecting portion;

a second mass assembly located such that the second mass assembly is displaceable relative to said mounting member and said first mass assembly in said direction of vibration, and said second mass assembly comprises a second cylindrical connecting portion which is located radially inwardly of said cylindrical support portion with a predetermined second radial distance therebetween;

a second elastic member elastically connecting said second mass assembly to said mounting member, and comprising a second annular rubber body interposed between said cylindrical support portion and said second cylindrical connecting portion; and oscillating means for generating an oscillating force acting on said first and second mass assemblies to cause relative displacement therebetween.

7. A vibration damper comprising:

a mounting member fixed to a subject body whose vibration is to be damped;

a first mass assembly located such that said first mass assembly is displaceable relative to said mounting member in a direction of vibration of said subject body;

a first elastic member elastically connecting said first mass assembly to said mounting member, and comprising a first rubber body interposed between said mounting member and said first mass assembly;

a second mass assembly located such that the second mass assembly is displaceable relative to said mounting member and said first mass assembly in said direction of vibration;

a second elastic member elastically connecting said second mass assembly to said mounting member, and comprising a second rubber body interposed between said mounting member and said second mass assembly, said second rubber body being formed integrally with said first rubber body; and oscillating means for generating an oscillating force acting on said first and second mass assemblies to cause relative displacement therebetween.

8. A vibration damper comprising:

a mounting member fixed to a subject body whose vibration is to be damped;

a first mass assembly located such that said first mass assembly is displaceable relative to said mounting member in a direction of vibration of said subject body;

a first elastic member elastically connecting said first mass assembly to said mounting member;

a second mass assembly located such that the second mass assembly is displaceable relative to said mounting member and said first mass assembly in said direction of vibration;

a second elastic member elastically connecting said second mass assembly to said mounting member; and, oscillating means for generating an oscillating force acting on said first and second mass assemblies to cause relative displacement therebetween, and said oscillating means comprises electromagnetic driving means for generating an electromagnetic force between said first and second mass assemblies, wherein one of said first and second mass assemblies includes a permanent magnet fixed thereto to form a magnetic path, while the other of said first and second mass assemblies includes a coil fixed thereto and disposed in a magnetic gap defined in said magnetic path, said electromagnetic driving means includes said permanent magnet and said coil for generating electromagnetic force between said first and second mass assemblies, by application of an electric current to said coil.

* * * * *